Figure 1:
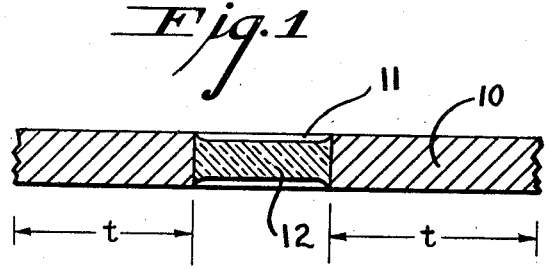

United States Patent Office 2,770,923
Patented Nov. 20, 1956

2,770,923

INTERNAL GLASS-TO-METAL SEAL

Robert H. Dalton and Raymond O. Voss, Corning, N. Y., assignors to Corning Glass Works, Corning, N. Y., a corporation of New York Application September 4, 1951, Serial No. 244,988

5 Claims. (Cl. 49—92.5)

This invention relates to a glass-to-metal seal of the type comprising a body of glass surrounded by and hermetically united to an outer metal sheath, hereinafter referred to as an internal glass-to-metal seal as distinguished from an external glass-to-metal seal in which the glass is the outer member. It is particularly concerned with such a seal wherein the glass body does not substantially protrude beyond the metal sheath.

The invention further relates to an internal glass-to-metal seal which is provided with a metallic electric conductor passing through and hermetically united with the glass body. Such a combination comprises both an internal and an external glass-to-metal seal and is utilized for introduction of leads into hermetically sealed containers of a variety of types, including radio and other electronic tubes or devices having metallic walls.

It is well known that the successful fabrication and use of an external glass-to-metal seal, in which the metal has substantial thickness normal to the sealing interface at the area of sealing, such as a beaded wire, require that the expansion coefficients of the glass and the metal be substantially matched. In other words, the expansion coefficient of the glass between its setting point and room temperature must be so close to that of the metal through the same temperature range that the difference in contraction of the glass and the metal on cooling will not cause stress in the glass of sufficient magnitude to break it. (By setting point is meant the temperature below which no substantial release of stress through plastic flow of the glass will take place.)

In an internal glass-to-metal seal, on the other hand, it is permissible that the glass have a somewhat lower expansion coefficient than the metal, since any stress that results in the glass on cooling is thereby largely compressive, in which condition glass has great strength. In fact, an expansion coefficient mismatch of this type may be an advantage in such a seal since the metal tends to shrink down on the glass and give a good mechanical bond between the two. It has been considered, however, that in such case an excessive difference between the expansion coefficients of the metal and the glass is objectionable and should be avoided except in the case where the metal in the area of the seal is extremely thin (a few thousandths of an inch) normal to the sealing interface, as, for example, in the so-called "Houskeeper" type seal of copper to glass.

With this exception prior internal glass-to-metal seals have therefore generally utilized glasses having expansion coefficients only slightly lower than those of the outer metal sheaths; and it has hitherto been accepted that aluminum could not be employed in such seals because the expansion coefficient of aluminum (about $250 \times 10^{-7}$ per ° C. between 0° and 300° C.) is so far in excess of that of any known glass. Furthermore, the melting point (660° C.) of aluminum is below the working point of most conventional glasses including those customarily used in such seals, and any attempt to fuse such a glass within a shaped aluminum member would melt the aluminum. (By working point is meant that temperature at which the glass has a viscosity in the neighborhood of 10,000 poises, at which point the glass is readily workable in a flame.)

We have now discovered that, contrary to the teachings of the prior art, an internal glass-to-aluminum seal can successfully be made with a glass of expansion greatly below that of aluminum, even though the aluminum member has substantial thickness normal to the sealing interface at the area of sealing, provided that the glass has a working point below the melting point of aluminum and provided that the glass member of the seal does not substantially extend or protrude beyond the outer aluminum member in the area of contact therewith. We have further found that a metallic electric conductor can be hermetically sealed through the glass in such a seal, and that such conductor can differ in expansion coefficient from the glass by up to about $50 \times 10^{-7}$ per ° C. without causing breaking stresses in the seal.

The working point of the glass must be below the melting point of aluminum so that it can be heated sufficiently to form a hermetic seal without melting the aluminum. Although a glass having a working point only slightly below the melting point of aluminum may be utilized if great caution is used in heating it to softness, it is preferable to employ a sealing glass having a working point of not more than about 575° C. so as to provide a greater margin of safety against accidental melting of the aluminum. Moreover, when an internal glass-to-metal seal is made between aluminum and such a glass, the glass does not crack nor spall, even though its expansion coefficient is far below that of aluminum, because its effective setting point is raised by its confinement by the aluminum, and the stress developed in the glass by the differential contraction of the glass and the aluminum on cooling is therefore lower in magnitude than would otherwise be expected. To insure a satisfactory seal structure, however, the glass member should not protrude beyond the outer aluminum member at the area of sealing thereto; otherwise, ringing off or other separation of that portion of the glass member extending beyond the aluminum member will occur at the junction of such portion with the aluminum member by reason of the complex stresses set up therein.

While the aluminum member of the instant glass-to-metal seal may have a sealing area of any thickness normal to the sealing interface, the present invention is particularly and unexpectedly useful in the fabrication of internal glass-to-aluminum seals where the aluminum member has a sealing area in excess of 7 mils in thickness normal to the sealing interface. We have found that internal glass-to-metal seals formed with such "massive" aluminum members in accordance with our invention are entirely satisfactory and that the glass is hermetically united with the aluminum. So far as we are aware, internal glass-to-aluminum seals of this type have not heretofore been considered feasible or even possible.

Various metals and metal alloys may be utilized for an electric conductor to be sealed through the glass of the present internal glass-to-metal seal. It is desirable in general to select such metal so that its expansion coefficient will approximate that of the glass. However, depending on the particular glass used for such seal, the particular metal desired to be employed for the electric conductor, the geometry of the seal, the use to which the seal is to be subjected, and similar considerations, a maximum difference in expansion coefficient of up to about $50 \times 10^{-7}$ per ° C. may be tolerated.

We have melted various glasses which meet the requirements for use for the present purpose. The chemical durability of many of such glasses leaves much to be desired, however. Glasses which are particularly suitable are described in the pending application of R. H. Dalton, Serial No. 651,818, filed March 4, 1946, issued June 23, 1953, as Patent No. 2,643,020, which glasses comprise essentially 60% to 85% PbO, 5% to 15% $Al_2O_3$ and at least one glass-forming oxide in the indicated proportion selected from the group consisting of up to 40% $B_2O_3$ and up to 20% $SiO_2$, the sum of such essential oxides being over 80%. Such glasses have expansion coefficients from $70\times10^{-7}$ to $90\times10^{-7}$ per ° C. between 0° and 300° C. An especially desirable composition within this range consists approximately of 75% PbO, 11% $Al_2O_3$, 11% $B_2O_3$ and 3% $SiO_2$, which has a working point of about 560° C. and an expansion coefficient of $84\times10^{-7}$ per ° C.

For a better understanding of the invention and its utility, reference is had to the accompanying drawing in which:

Fig. 1 is an exaggerated fragmentary sectional view of an article comprising an internal glass-to-aluminum seal in which a "massive" member 10 (shown in part) composed of aluminum is provided with a hole 11 extending therethrough and containing a body 12 composed of a glass having a working point below the melting point of aluminum and hermetically united with the wall of the hole 11. Such a seal may be employed for closing a tubulature of aluminum or to provide a glass window in a receptacle composed of aluminum or comprising an aluminum part. The member 10 may possess any desired shape such as tubular, flat, or curved. The thickness $t$ of the aluminum member at its sealing area is in excess of 7 mils. By "thickness" we mean the dimension of the aluminum member substantially normal to the sealing plane or interface.

Figure 2:
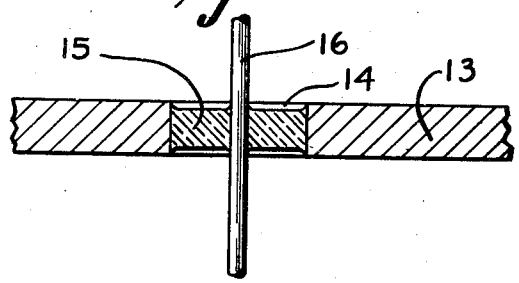

Fig. 2 is an exaggerated fragmentary sectional view of an article similar to that shown in Fig. 1 in which a member 13 (shown in part) composed of aluminum is provided with a hole 14 extending therethrough, a body 15 composed of a glass having a working point below the melting point of aluminum and hermetically united with the wall of the hole 14, and a metal member 16 hermetically sealed through the glass body 15. The member 16 may be composed of any metal or metal alloy having an expansion coefficient within about $50\times10^{-7}$ per °C. of that of the glass. Such an arrangement frequently described as an "eyelet" type seal, may be used to introduce insulated metallic leads through a metal envelope as in the metallic base of an electronic tube or the aluminum reflector of a hermetically sealed incandescent lamp.

In carrying out the invention the glass to be sealed within the aluminum member is introduced into the hole therein in any convenient manner. Preferably the glass is preshaped either by molding while plastic or by shaping in powdered form followed by sintering. The dimensions of such preformed glass body should coincide approximately with the hole in the aluminum member. If the seal is to contain an electric conductor, the glass body should be provided with an opening to permit introduction of the conductor therethrough; or such conductor may be sealed into the glass body in a prior operation.

To make the seal, the various parts are placed in their intended relative positions and the assembly is heated to above the working point of the glass, care being taken not to melt the aluminum. If the glass body is thick enough to require annealing, the assembly may be cooled slowly to accomplish the same.

An internal glass-to-aluminum seal in which the aluminum member has a sealing area not in excess of 7 mils in thickness normal to the sealing interface is described and claimed in our copending application Serial No. 219,430 filed April 5, 1951 issued May 10, 1955 as Patent No. 2,707,850.

What is claimed is:

1. An internal glass-to-metal seal comprising an aluminum member having an opening extending therethrough and surrounding and hermetically united with a unitary glass member positioned in said opening, the glass having a working point below the melting point of aluminum, said inner glass member not protruding beyond the outer aluminum member at the area of sealing thereto, the aluminum member extending more than 7 mils in a direction substantially normal to the glass-aluminum interface.

2. A glass-to-metal seal according to claim 1, in which the glass has a working point not over 575° C.

3. A glass-to-metal seal according to claim 1, in which the glass comprises essentially 60% to 85% PbO, 5% to 15% $Al_2O_3$ and at least one glass-forming oxide in the indicated proportion selected from the group consisting of up to 40% $B_2O_3$ and up to 20% $SiO_2$, the sum of such essential oxides being over 80%.

4. An internal glass-to-metal seal comprising an aluminum member having an opening extending therethrough and surrounding and hermetically united with a unitary glass member positioned in said opening, the glass having a working point below the melting point of aluminum, said inner glass member not protruding beyond the outer aluminum member at the area of sealing thereto, the aluminum member extending more than 7 mils in a direction substantially normal to the glass-aluminum interface and a metallic electric conductor passing through and hermetically united with the glass.

5. An internal glass-to-metal seal comprising an aluminum member having an opening extending therethrough and surrounding and hermetically united with a unitary glass member positioned in said opening, the glass having a working point below the melting point of aluminum, said inner glass member not protruding beyond the outer aluminum member at the area of sealing thereto, the aluminum member extending more than 7 mils in a direction substantially normal to the glass-aluminum interface and a metallic electric conductor passing through and hermetically united with the glass, the expansion coefficient of the conductor being within about $50\times10^{-7}$ per °C of that of the glass.

References Cited in the file of this patent

UNITED STATES PATENTS

| | | |
|---|---|---|
| 2,210,489 | Lemmens et al. | Aug. 6, 1940 |
| 2,419,049 | Alpert | Apr. 15, 1947 |
| 2,521,846 | Gregory | Sept. 12, 1950 |
| 2,534,392 | Walsh | Dec. 19, 1950 |
| 2,549,504 | Messana | Apr. 17, 1951 |

FOREIGN PATENTS

| | | |
|---|---|---|
| 106,837 | Australia | Mar. 6, 1939 |
| 583,242 | Great Britain | Dec. 12, 1946 |
| 625,466 | Great Britain | June 28, 1949 |
| 634,657 | Great Britain | Mar. 22, 1950 |